US008467835B2

(12) United States Patent
Lee et al.

(10) Patent No.: US 8,467,835 B2
(45) Date of Patent: Jun. 18, 2013

(54) MOBILE TERMINAL AND CONTROLLING METHOD THEREOF

(75) Inventors: Yun Sung Lee, Seoul (KR); Gi Hoon Tho, Seoul (KR); Chang-Bai Won, Suwon-si (KR); Yong Jin Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 12/770,386

(22) Filed: Apr. 29, 2010

(65) Prior Publication Data
US 2010/0279740 A1 Nov. 4, 2010

(30) Foreign Application Priority Data

Apr. 30, 2009 (KR) ........................ 10-2009-0038049

(51) Int. Cl.
*H04M 1/00* (2006.01)
*H04B 1/38* (2006.01)

(52) U.S. Cl.
USPC ........................................................ 455/566

(58) Field of Classification Search
USPC ................... 455/566, 127.1, 127.5, 572, 573, 455/343.1, 550.1, 575.1, 157.2, 159.1, 159.2, 455/154.2
See application file for complete search history.

(56) References Cited

U.S. PATENT DOCUMENTS

| 5,886,688 A | 3/1999 | Fifield et al. |
| 6,181,648 B1 * | 1/2001 | Mafune et al. ................. 368/84 |
| 2008/0094025 A1 | 4/2008 | Rosenblatt et al. |

FOREIGN PATENT DOCUMENTS

WO        WO 96/18930 A1    6/1996

* cited by examiner

*Primary Examiner* — Eugene Yun
(74) *Attorney, Agent, or Firm* — Birch, Stewart, Kolasch & Birch, LLP

(57) ABSTRACT

A mobile terminal and controlling method thereof are disclosed. The mobile terminal includes a solar cell module and a selective transmitting member for selectively transmitting light, thereby supplying the light to the solar cell module selectively. Accordingly, since a light-transmitting display and a solar cell module are stacked on each other, the present invention enables a user to appreciate information displayed on the light-transmitting display while enabling the solar cell module to charge a battery. Moreover, since the light having passed through a light-transmitting display can be reflected by a selective transmission member provided between the light-transmitting display and a solar cell module, the present invention is able to enhance readability of information displayed on the light-transmitting display.

14 Claims, 15 Drawing Sheets

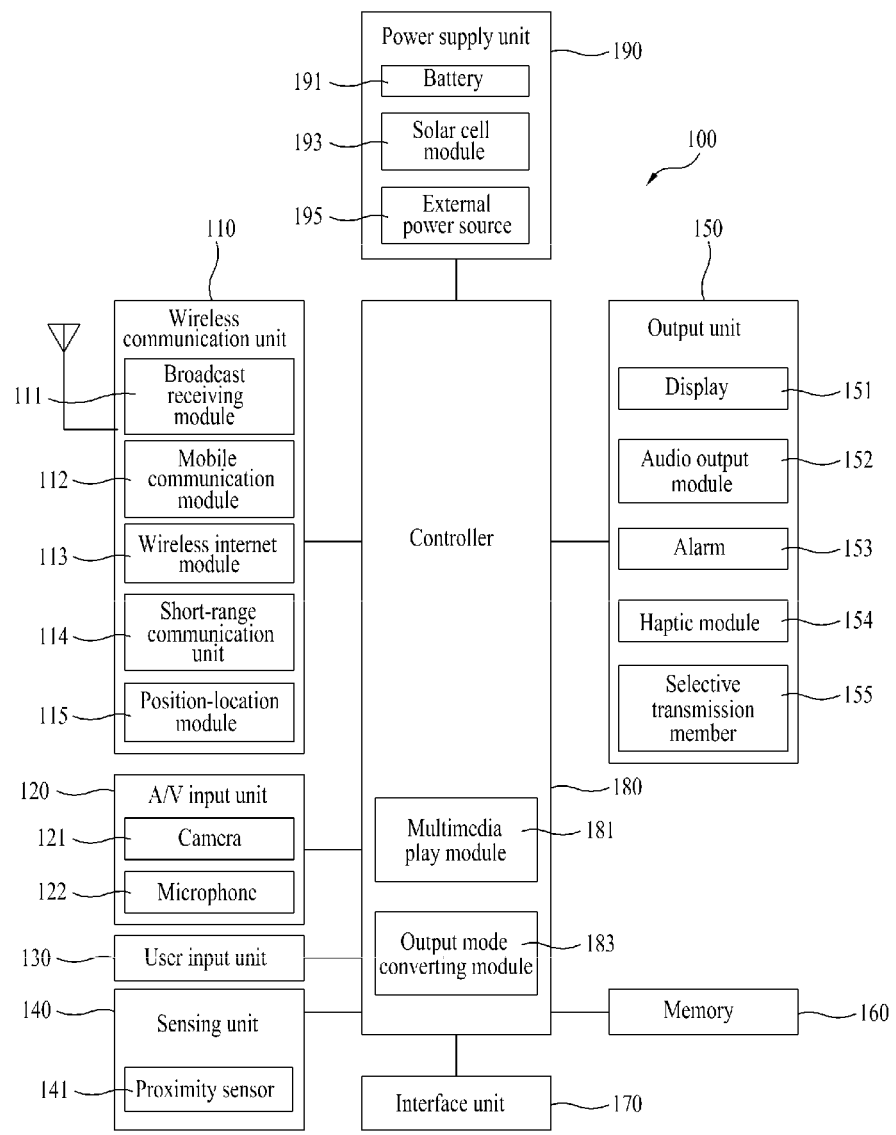

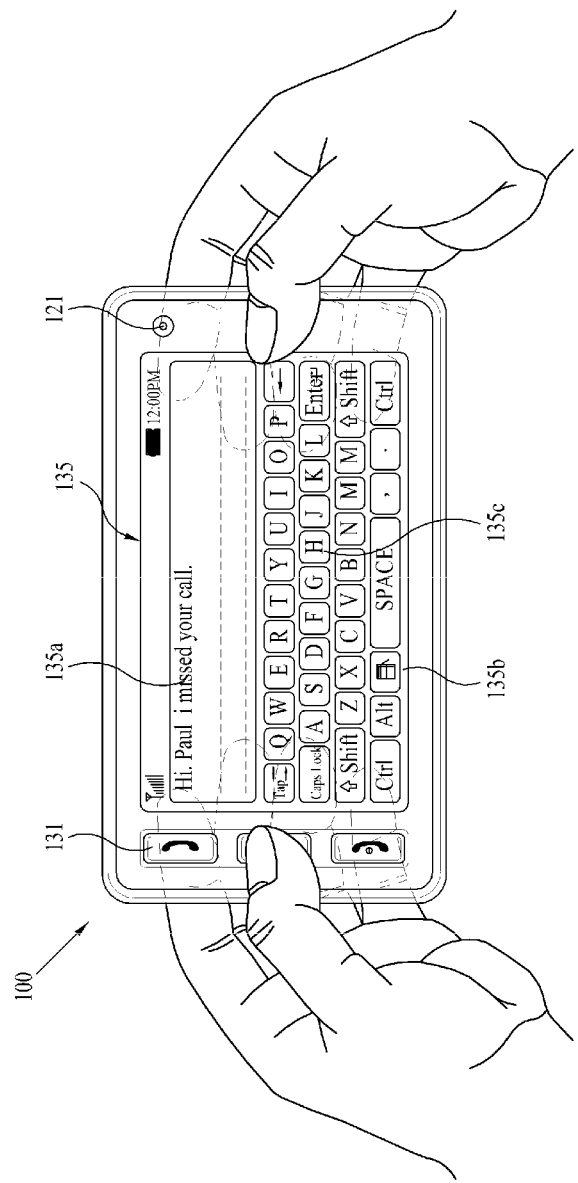

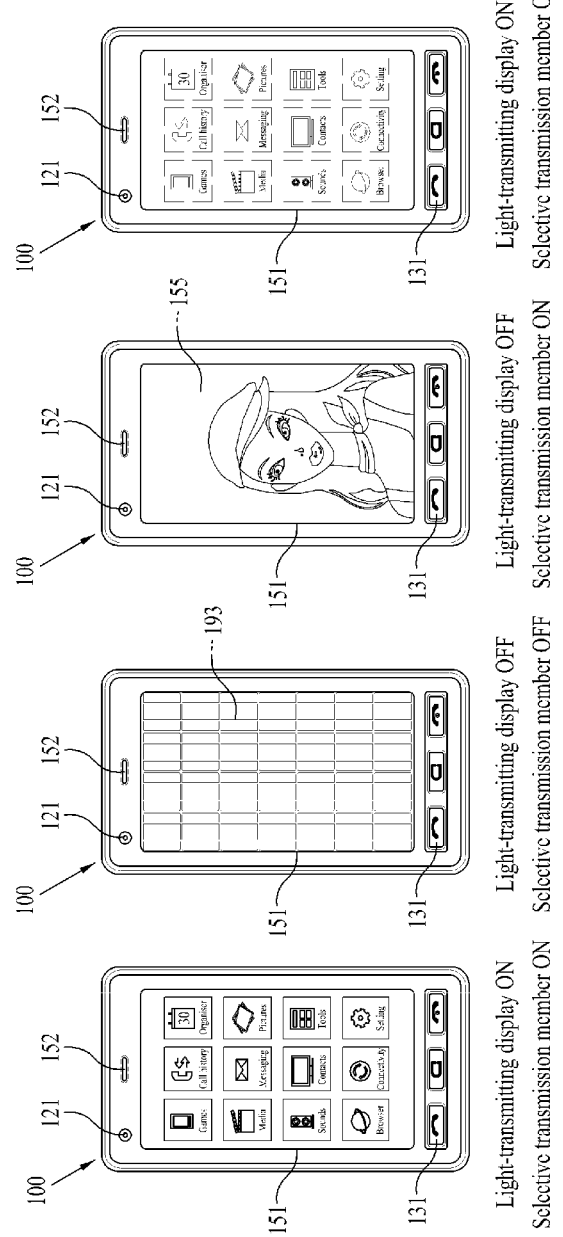

MOBILE TERMINAL AND CONTROLLING METHOD THEREOF

Pursuant to 35 U.S.C. §119(a), this application claims the benefit of earlier filing date and right of priority to Korean Application No. 10-2009-0038049, filed on Apr. 30, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for the mobile terminal to include a solar cell module and a selective transmitting member for selectively transmitting light.

2. Discussion of the Related Art

Generally, terminals can be classified into mobile terminals and stationary terminals according to a presence or non-presence of mobility. And, the mobile terminals can be further classified into handheld terminals and vehicle mount terminals according to availability for hand-carry.

As functions of the terminal tend to be diversified, the terminal is implemented as a multimedia player type equipped with composite functions including picture or video photographing, music or video file playback, games, broadcast reception and the like for example.

Recently, a mobile terminal absorbs function of independent multimedia devices and its unique field is ongoing to dilute.

As a display provided to a front side of a recently introduced mobile terminal is configured to detect a touch input, the display itself is usually used as a user input unit. And, a recent mobile terminal adopts a solar cell to convert such light as sunlight and the like to electric energy.

A solar cell can be provided to a mobile terminal, and more particularly, to a front or back side of a main body having a plane in a predetermined size. Yet, as mentioned in the foregoing description, since such a user input unit as a display, a keypad and the like is provided to a front side of a mobile terminal, a space for receiving a solar cell therein is not sufficient. Therefore, a solar cell is usually provided to a backside of a main body of a mobile terminal.

However, in case that a solar cell is provided to a backside of a main body of a mobile terminal, the mobile terminal should be placed upside down while charged. Therefore, a user is unable to check information provided via a display of the mobile terminal or the like in the course of a charging process. Moreover, the mobile terminal needs to be inconveniently turned upside down again to enable a user to check a fully-charged state.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which various effects including readability enhancement of a displayed picture, generation of mirror effect, full charging display and the like can be brought.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a light-transmitting display, at least one housing configured to have the light-transmitting display loaded therein, a selective transmission member provided under the light-transmitting display to selectively transmit or cut off light according to a presence or non-presence of application of a power, a solar cell module provided under the selective transmission member, and a controller controlling the light-transmitting display and the selective transmission member.

Preferably, the controller controls ON/OFF of each of the light-transmitting display and the selective transmission member according to a user input or a setting condition.

More preferably, the controller independently controls the ON/OFF of the light-transmitting display and the ON/OFF of the selective transmission member according to the user input. In this case, the controller controls the light-transmitting display and the selective transmission member to enter one selected from the group consisting of a first mode that both of the light-transmitting display and the selective transmission member are in ON state, a second mode that both of the light-transmitting display and the selective transmission member are in OFF state, a third mode that the light-transmitting display and the selective transmission member are in the OFF state and the ON state, respectively, and a fourth mode that the light-transmitting display and the selective transmission member are in the ON state and the OFF state, respectively.

Preferably, the mobile terminal further includes a battery charged with electric energy converted in the solar cell module. The controller controls the selective transmission member to automatically enter an OFF state when a charged level of the battery becomes equal to or lower than a predetermined level.

Preferably, when the selective transmission member is controlled to enter an ON state by having the power applied thereto, the selective transmission member reflects the light.

In another aspect of the present invention, a mobile terminal includes a housing forming a main body, a solar cell module provided to at least one of a front side or a backside of the housing, and a selective transmission member provided over the solar cell module to selectively transmit or cut off light according to a presence or non-presence of application of a power.

Preferably, the mobile terminal further includes a controller controlling the selective transmission member, wherein the controller controls ON/OFF of the selective transmission member according to a user input or a setting condition.

More preferably, when the selective transmission member is controlled to enter an ON state by having the power applied thereto, the selective transmission member reflects the light.

More preferably, the mobile terminal further includes a battery charged with electric energy converted in the solar cell module. The controller controls the selective transmission member to be turned on to cut off the light when a charged level of the battery becomes equal to or higher than a predetermined level.

More preferably, the ON/OFF of the selective transmission member is controlled to be repeated with a predetermined time interval. In this case, the mobile terminal further includes a battery charged with electric energy converted in the solar cell module. The controller controls the ON/OFF of the selective transmission member to be repeated with the predetermined time interval when a charged level of the battery becomes equal to or higher than a predetermined level, a text message is received or a call signal is received. And, the predetermined time interval for controlling the ON/OFF of the selective transmission member repeatedly varies differently when the charged level of the battery becomes equal to or higher than the predetermined level, the text message is received or the call signal is received.

Preferably, the housing includes a light-transmitting housing configured to transmit the light.

In a further aspect of the present invention, in a mobile terminal including a light-transmitting display, at least one housing configured to have the light-transmitting display loaded therein, a selective transmission member provided under the light-transmitting display to selectively transmit or cut off light according to a presence or non-presence of application of a power, and a solar cell module provided under the selective transmission member, a method of controlling the mobile terminal includes the step of controlling ON/OFF of each of the light-transmitting display and the selective transmission member according to a user input or a setting condition.

Preferably, the ON/OFF of the light-transmitting display and the ON/OFF of the selective transmission member are independently controlled according to the user input.

Preferably, the light-transmitting display and the selective transmission member are controlled to enter one selected from the group consisting of a first mode that both of the light-transmitting display and the selective transmission member are in ON state, a second mode that both of the light-transmitting display and the selective transmission member are in OFF state, a third mode that the light-transmitting display and the selective transmission member are in the OFF state and the ON state, respectively, and a fourth mode that the light-transmitting display and the selective transmission member are in the ON state and the OFF state, respectively.

Preferably, the mobile terminal further includes a battery charged with electric energy converted in the solar cell module. And, the selective transmission member is controlled to automatically enter an OFF state when a charged level of the battery becomes equal to or lower than a predetermined level.

Accordingly, the present invention provides the following effects and/or advantages.

First of all, the present invention can selectively supply light to a solar cell module provided to a mobile terminal.

Secondly, since a light-transmitting display and a solar cell module are stacked on each other, the present invention enables a user to appreciate information displayed on the light-transmitting display while enabling the solar cell module to charge a battery.

Thirdly, since the light having passed through a light-transmitting display can be reflected by a selective transmission member provided between the light-transmitting display and a solar cell module, the present invention is able to enhance readability of information displayed on the light-transmitting display.

Finally, since a mirror effect can be obtained by a selective transmission member provided over a solar cell module, the present invention provides a user with convenience and facilitation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal in accordance with an embodiment of the present invention;

FIG. 3A and FIG. 3B are front diagrams of a mobile terminal according to one embodiment of the present invention for explaining one operational status of the mobile terminal, respectively;

FIG. 7 is a diagram for explaining an operational status of the mobile terminal shown in FIG. 6;

DETAILED DESCRIPTION OF THE INVENTION

Figure 2A:
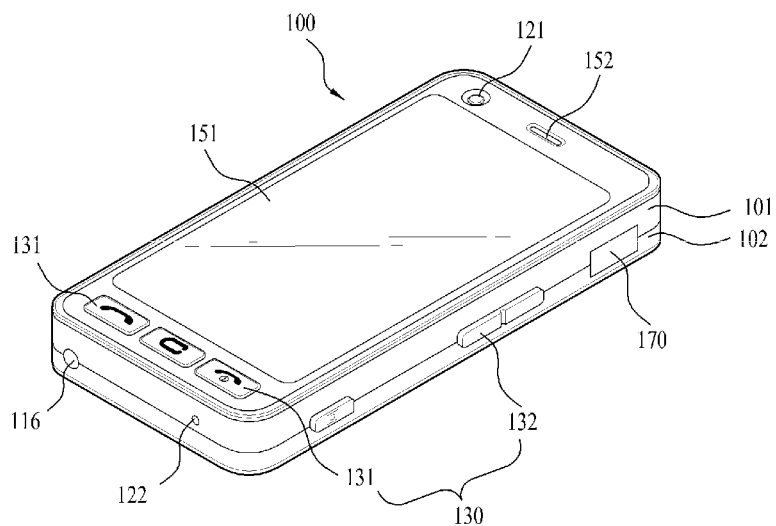
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Meanwhile, the A/V (audio/video) input unit 120 is configured to input an audio signal or a video signal and can include a camera module 121, a microphone module 122 and the like. The camera module 121 processes an image frame of a still or moving picture obtained by an image sensor in a video call mode or a photographing mode. And, the processed image frame can be displayed on the display 151.

The image frame processed by the camera module 121 is stored in the memory 160 or can be externally transmitted via the wireless communication unit 110. At least two camera modules 121 can be provided according to a configuration type of the terminal.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. This input data can include input data for on-off operation control of a light-transmitting display 150 and a selective transmission member 155/155' explained later.

Examples of such devices include a keypad, a dome switch, a touchpad (e.g., static pressure/capacitance), a jog wheel, a jog switch, etc.

The sensing unit 140 detects such a current configuration of the mobile terminal 100 as an open/closed configuration of the mobile terminal 100, a location of the mobile terminal 100, a presence or non-presence of user contact and the like and then generates a sensing signal for controlling an operation of the mobile terminal 100.

For instance, if the mobile terminal 100 is a slide phone type, the sensing unit 140 is able to sense whether a slide phone is open or closed. And, the sensing unit 140 is responsible for sensing functions related to a presence or non-presence of power supply of the power supply 190, an external device loading of the interface unit 170 and the like.

Meanwhile, the sensing unit 140 can include a proximity sensor 141.

The output unit 150 is configured to output an audio signal, a video signal and/or an alarm signal. And, the output unit 150 can include the display 151, an audio output module 152, an alarm output module 153, a haptic module 154, a selective transmission member 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can have a transparent or light-transmitting configuration to be externally viewable therethrough. And, such a display can be called a light-transmitting display. TOLED (transparent OLED), AMOLED (active matrix OLED) and the like are representative examples of the light-transmitting displays. And, a rear structure of the display can have the light-transmitting configuration as well. Owing to theses configurations, a user is able to project light toward a rear side of the light-transmitting display via an area occupied by a display of a terminal body.

A mobile terminal according to one embodiment of the present invention can include the above-configured light-transmitting display 151. This shall be described in detail later.

According to an implementation type of the mobile terminal 100, at least two displays 151 can exist in the mobile terminal 100. For instance, a plurality of displays can be arranged on one face of the mobile terminal 100 in a manner of being spaced apart from each other or being built in one body. For another instance, a plurality of displays can be arranged on different faces of the mobile terminal 100, respectively.

In case that the display 151 and a sensor for detecting a touch action (hereinafter called 'touch sensor') of such a pointer as a user's finger, a pen and the like configures a mutual layer structure (hereinafter called 'touchscreen'), it is able to use the display 151 as an input device as well as an output device. In this case, the touch sensor can be configured with a touch film, a touch sheet, a touchpad or the like for example.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know which portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

Moreover, the output unit 150 can further include a selective transmission member controlled by the controller 180. In this case, the selective transmission member 155 means the member enables light to be transmitted or reflected in accordance with whether a power is applied or not. This shall be explained later.

The memory 160 can store programs for the processing and control of the controller 180 and is also able to perform a function for temporary storage of inputted/outputted data (e.g., phonebook data, message data, still picture data, moving picture data, etc.). Moreover, the memory 160 can store data of various patterns of vibration and sound outputted in case of the touch input to the touchscreen.

The memory 160 can include at least one storage medium of such a type as a flash memory type, a hard disk type, a multimedia card micro type, a card type memory (e.g., SD memory, XD memory, etc.), RAM and ROM. Moreover, the mobile terminal 100 is able to operate a web storage that performs a storage function of the memory 160 on internet.

The interface unit 170 plays a role as an interface with every external device connected to the mobile terminal 100. For instance, the external devices include a wire/wireless headset, an external electricity charger, a wire/wireless data port, a card socket (e.g., memory card socket, SIM/UIM card socket, etc.), audio I/O (input/output) terminals, video I/O (input/output) terminals, earphones, etc. The interface unit 170 receives data from the external device or is supplied with power. The interface unit 170 then delivers the received data or the supplied power to the corresponding component within the mobile terminal 100 or transmits data within the portable terminal 100 to the corresponding external device.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 normally controls overall operations of the mobile terminal 100. For instance, the controller 180 performs the control and processing related to speech call, data communication, video call and the like. And, the controller 180 can be provided with a multimedia play module 181 for multimedia playback as well. The multimedia playback module 180 can be configured as hardware within the controller 180 or software separate from the controller 180.

The controller 180 is able to perform a pattern recognizing processing for recognizing a handwriting input or a drawing input performed on the touchscreen into a character and an image, respectively.

And, the controller 180 is able to control the on-off operations of the display 151 and the selective transmission member 155.

The power supply 190 receives an external and/or internal power source and then supplies power required for operations of the respective components, under the control of the controller 180.

The power supply unit 190 is able to include a battery 191 charged with electric energy. The electric energy is stored in the battery 191 and is then supplied to the mobile terminal. In this case, the battery 191 can be detachably attached to the mobile terminal or can be built in the mobile terminal.

Current supplied to the battery 191 of the power supply unit 190 can include that of an external power source 195. Power can be supplied to the battery for a charging using a separately provided cable or adapter.

The power supply unit 190 of the mobile terminal according to the present invention can include a solar cell module 193 as a supplier of the power. The solar cell module 193 converts such a light source as sunlight to current and then supplies the current to the mobile terminal.

The solar cell module 193 is attached in form of a board to the front or back side of the mobile terminal 100 and is then able to supply current. The current supplied by the solar cell module 193 is stored in the battery 191 or can be directly usable.

The solar cell module 193 converts such a light source as sunlight to electric energy using semiconductors of two types (i.e., P type semiconductor and N type semiconductor). If light is thrown to the solar cell module 193, electrons and holes are generated inside. The generated electric charges migrate to P and N poles to generate a potential difference (i.e., photoelectromotive force) between the P and N poles. If a load is connected to the solar cell module 193, current starts to flow. This is called a photoelectric effect. Therefore, the electric energy is generated from this photoelectric effect. A solar cell can be provided as a board type module. In a large-scale system, a plurality of solar cells 193 are connected in parallel/serial to use.

The solar cell module 193 of the mobile terminal 100 can have capacity and size suitable for requirements of the mobile terminal 100. The mobile terminal according to the present invention can include the above configured solar cell module 193 as the power supply unit 190. The solar cell module 193 provided to the mobile terminal of the present invention is further characterized in being selectively supplied with such light as sunlight and the like. The selective transmission member 155 is able to provide a structure for supplying light to the solar cell module 193 selectively. Details of the position relation between the selective transmission member 155 and the solar cell module 193 shall be explained later.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a housing configuring an exterior thereof. In the present embodiment, the housing can be divided into a front housing 101 and a rear housing 102. Various electric/electronic parts are loaded in a space provided between the front and rear housings 101 and 102. Optionally, at least one middle housing can be further provided between the front and rear housings 101 and 102 in addition.

The housings 101 and 102 are formed by injection molding of synthetic resin or can be formed of metal substance such as stainless steel (STS), titanium (Ti) or the like for example.

In particular, each of the housings 101 and 102 can include a light-transmitting (transmittive) housing capable of transmitting light. For instance, the front housing 101 and/or the rear housing 102 is formed by injection molding of transparent synthetic resin. In this case, since intensity of incident light supplied to the solar cell module 193/193' provided to the housing 101/102 increases, it is advantageous in that a charging process can be performed more quickly.

A display 151, an audio output unit 152, a camera 121, user input units 130/131 and 132, a microphone 122, an interface 180 and the like can be provided to the terminal body, and more particularly, to the front housing 101.

The display 151 occupies most of a main face of the front housing 101. The audio output unit 151 and the camera 121 are provided to an area adjacent to one of both end portions of the display 151, while the first user input unit 131 and the microphone 122 are provided to another area adjacent to the other end portion of the display 151. The second user input unit 132 and the interface 170 can be provided to lateral sides of the front and rear housings 101 and 102.

The user input unit 130 is manipulated to receive a command for controlling an operation of the terminal 100. And, the input unit 130 is able to include a plurality of user input units 131 and 132. The user input units 131 and 132 can be generally named a manipulating portion and may adopt any mechanism of a tactile manner that enables a user to perform a manipulation action by experiencing a tactile feeling.

Content inputted by the first and second user input units 131 and 132 can be diversely set. For instance, such a command as start, end, scroll and the like is inputted to the first user input unit 131. And, a command for a volume adjustment of sound outputted from the audio output unit 152, a command for a switching to a touch recognizing mode of the display 151 or the like can be inputted to the second user input unit 132.

Figure 2B:
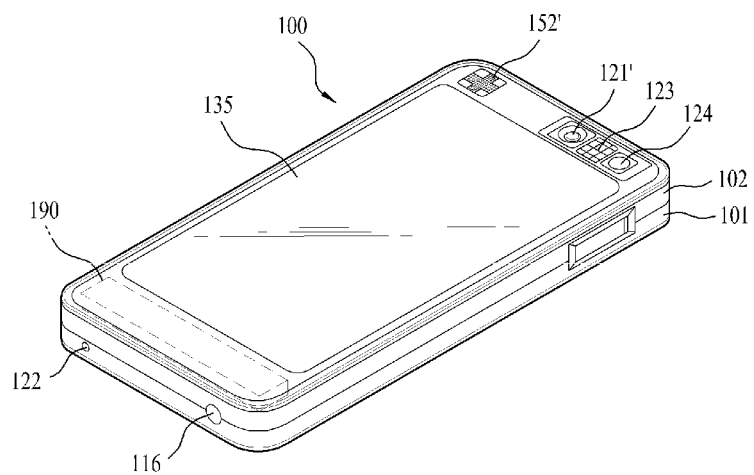
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear housing 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear housing 102. The touchpad 135 can be configured in a light transmitting type like the display 151.

Moreover, a selective transmission member (not shown in the drawing) and a solar cell module (not shown in the drawing) can be provided in a manner of being stacked on each other together with or instead of the touchpad 135. This case of providing a selective transmission member (not shown in the drawing) and a solar cell module (not shown in the drawing) in a manner of stacking them together with or instead of the touchpad 135 shall be described later.

In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear housing 102 as well.

The touchpad 135 is activated by interconnecting with the display 151 of the front housing 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3A and FIG. 3B as follows.

Figure 3A:
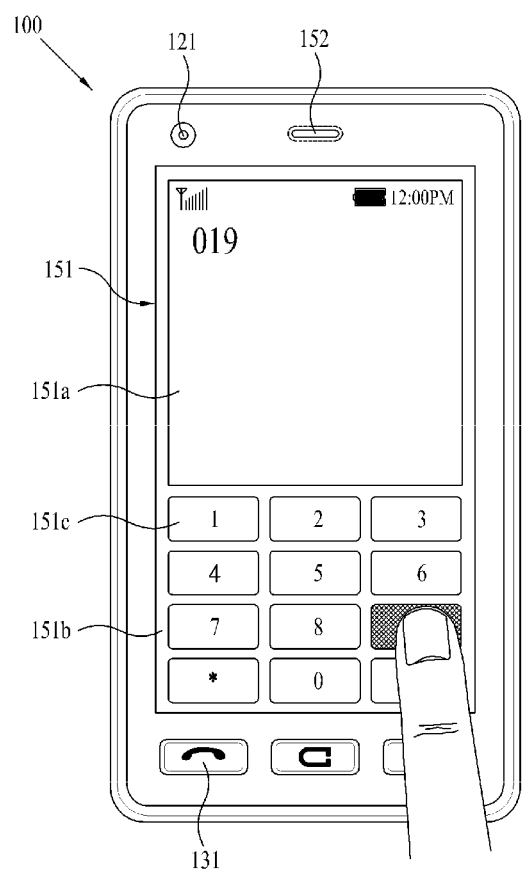

FIG. 3A and FIG. 3B are front-view diagrams of a mobile terminal according to one embodiment of the present invention for explaining an operational state thereof.

First of all, various kinds of visual informations can be displayed on the display 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display 151 can be configured to change an output picture according to the arranged direction of the terminal body.

FIG. 3B shows that a text input mode is activated in the mobile terminal.

An output window 135a and an input window 135b are displayed on the display 151. A plurality of soft keys 135c representing at least one of characters, symbols and digits can be arranged in the input window 135b. The soft keys 135c can be arranged in the QWERTY key formation.

If the soft keys 135c are touched through the touchpad 135), the characters, symbols and digits corresponding to the touched soft keys are outputted to the output window 135a. Thus, the touch input via the touchpad 135 is advantageous in that the soft keys 135c can be prevented from being blocked by a finger in case of touch, which is compared to the touch input via the display 151. In case that the display 151 and the touchpad 135 are configured transparent, it is able to visually check fingers located at the backside of the terminal body. Hence, more correct touch inputs are possible.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
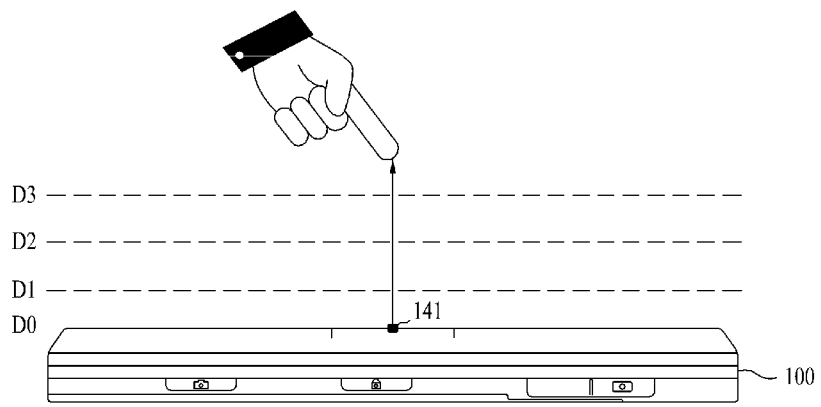
FIG. 4 is a diagram to explain the concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable of sensing three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Figure 5:
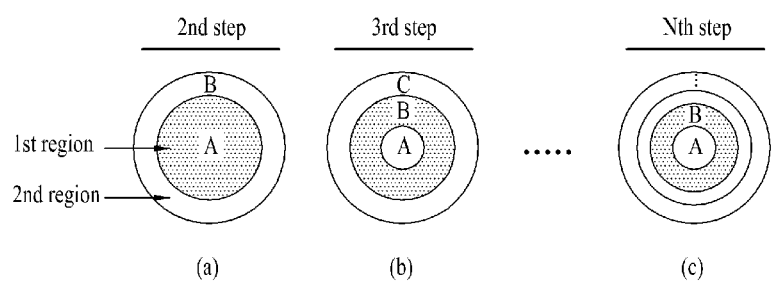
FIG. 5 is a diagram to explain the concepts of a proximity touch recognizing area and a tactile effect generating area, respectively.

FIG. 5(a) and FIG. 5(b) are diagrams for the description of a proximity touch recognition area and a tactile effect generation region.

FIG. 5(a) represents such an object as an icon, a menu item and the like in a circle type for clarity and convenience of explanation.

A region for displaying an object on the display 151, as shown in FIG. 5(a), can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For instance, in FIG. 5(a), it is able to set the proximity touch recognition region to the area including both of the first and second regions A and B. And, it is able to set the haptic region to the first region A.

It is able to discriminate the region having the object displayed therein into three regions A, B and C as shown in FIG. 5(b). Alternatively, it is able to discriminate the region having the object displayed therein into N regions (N>4) as shown in FIG. 5(c). And, it is able to configure each of the divided regions to generate a tactile effect having a different strength or pattern. In case that a region having a single object represented therein is divided into at least three regions, it is able to set the haptic region and the proximity touch recognition region to differ from each other according to a use environment.

In case of dividing the object-displayed region for the setting of the haptic region or the proximity touch recognition region, it is able to use one of various schemes of horizontal/vertical division, radial division and combinations thereof as well as the concentric circle type division shown in FIG. 5(a).

According to one embodiment of the present invention, the above-described method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The respective configurations disclosed in the aforesaid embodiments of the present invention can be used by those skilled in the art in a manner of being selectively combined with one another. Therefore, the present invention is non-limited by the embodiments disclosed herein but intends to give a broadest scope matching the principles and new features disclosed herein.

Figure 6:
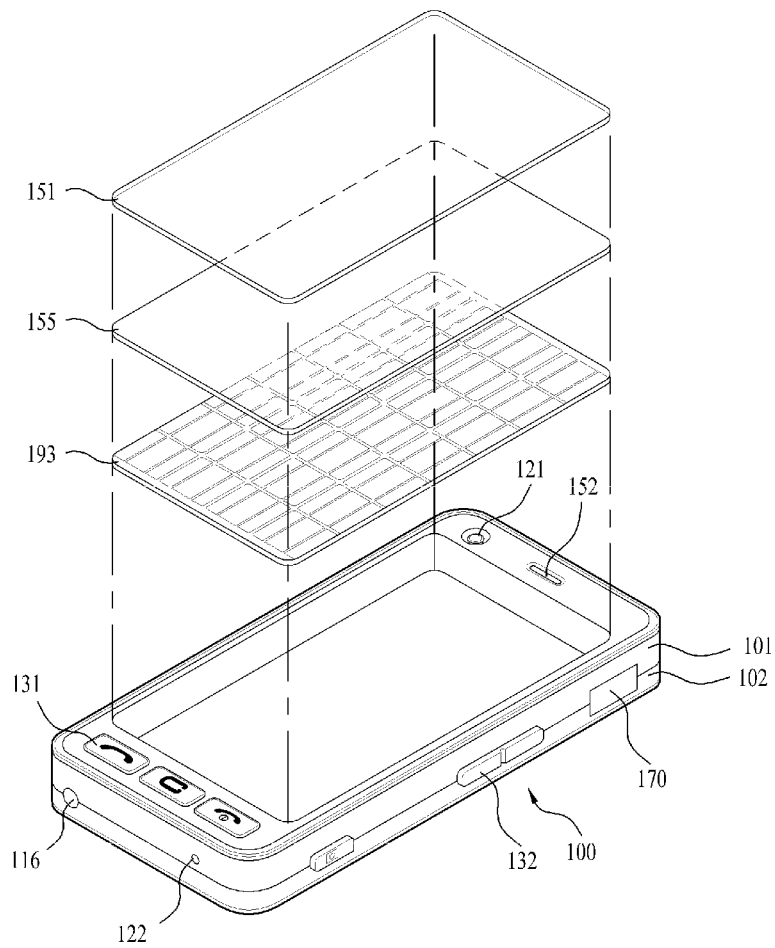
FIG. 6 is a perspective diagram of a mobile terminal according to one embodiment of the present invention.
Figure 8A:
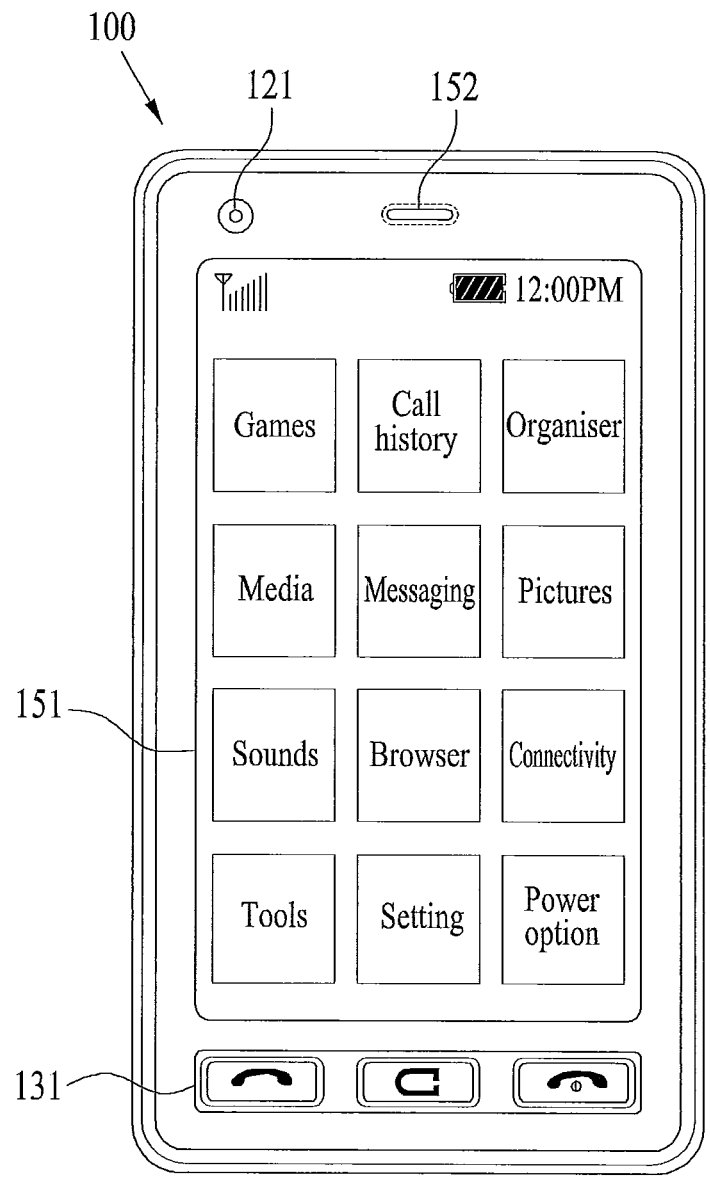
FIG. 8 is a diagram of a mobile terminal on which icons are displayed according to manipulation performed on the mobile terminal.
Figure 8B:
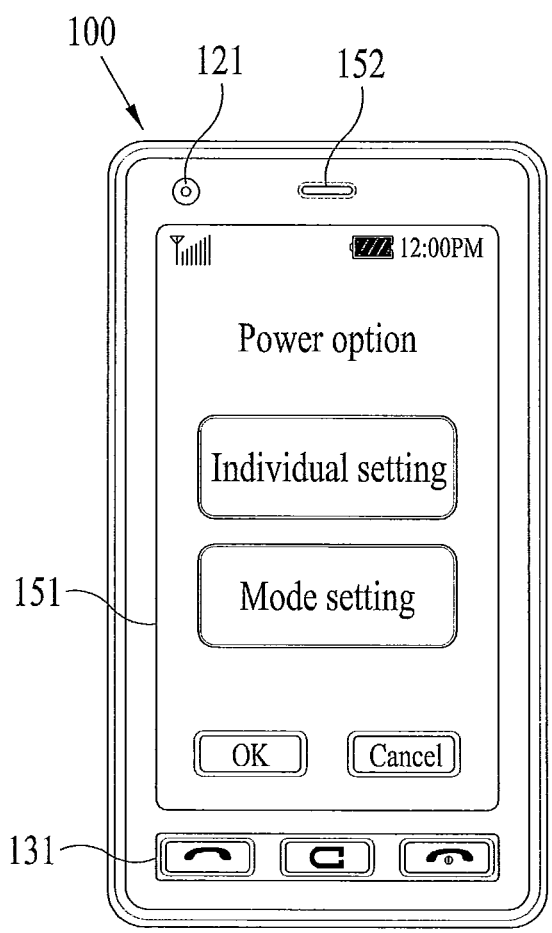
Figure 8C:
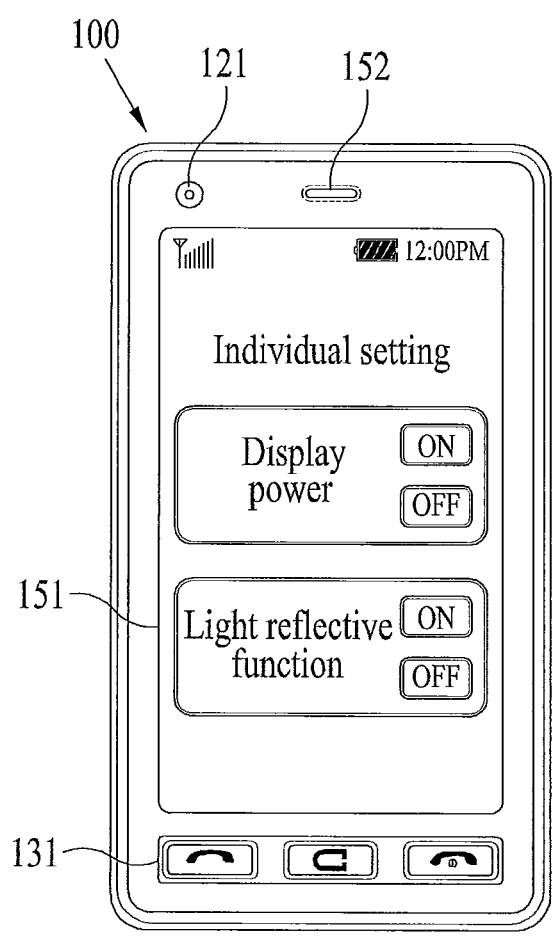
Figure 8D:
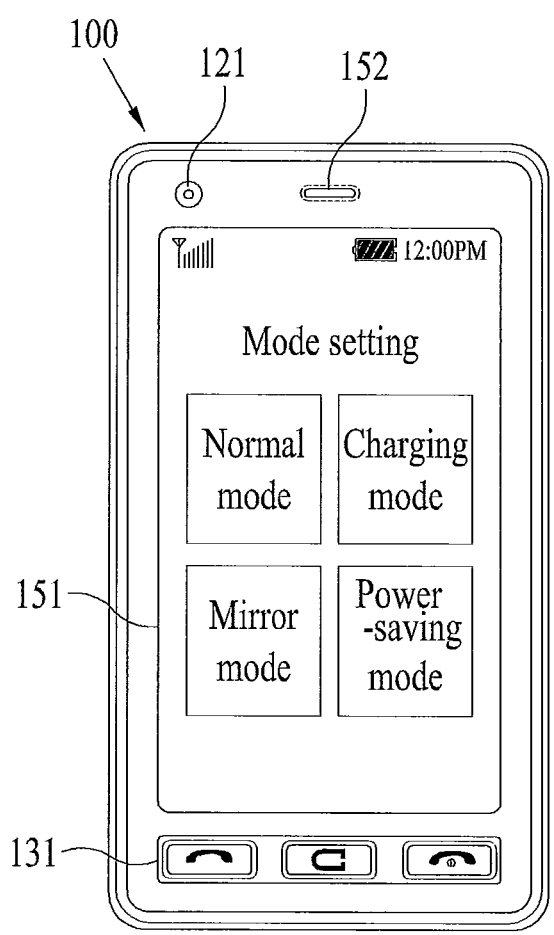

FIG. 6 is a perspective diagram of a mobile terminal according to one embodiment of the present invention. In the embodiment shown in FIG. 6, a mobile terminal 100 is placed to have its front side to face upward. In this case, the display can have a light-transmitting type. Generally, the reason why the light-transmitting display is provided is because a user can observe an object located behind the display. In addition, a mobile terminal according to one embodiment of the present invention includes a light-transmitting display to supply light to a solar cell module 193 provided under the light-transmitting display 151.

Referring to FIG. 6, in a mobile terminal according to one embodiment of the present invention, a light-transmitting display 151 and a solar cell module 193 are loaded in a manner of being stacked so that light provided over the light-transmitting display 151 can penetrate the light-transmitting display 151 to be supplied to the solar cell module 193.

In order to selectively cut off the light supplied to the solar cell module 193 via the light-transmitting display 151, a selective transmission member 155 can be further provided between the light-transmitting display 151 and the solar cell module 193. The selective transmission member 155 plays a role in transmitting or cutting off (or shielding) light in accordance with whether a power is applied.

As materials for controlling transparency or non-transparency according to a presence or non-presence of power application, PNLC (Polymer Network Liquid Crystal), PDLC (Polymer Dispersed Liquid Crystal), Mirror Film, UMU Film, light illumination film and the like have been introduced.

Each of the above materials can selectively change its transparency according to a presence or non-presence of the power application. If the transparency is lowered, light can be cut off. If the power is applied, the mirror film or the like among the materials has a mirror-like surface to bring a light-reflective effect as well.

The selective transmission member 155, which is provided over the solar cell module 193 of the mobile terminal according to the present invention to selectively cut off the light supplied to the solar cell module 193, is non-limited by the above-mentioned materials.

Therefore, the selective transmission member 155 can be formed of every material capable of controlling light to be selectively cut off according to a presence or non-presence of power application.

Moreover, it is preferable that the selective transmission member 155 is set to cut of light transmission if a power is applied. In particular, if the power is not applied, the selective transmission member 155 is preferably set to transmit light. If the power is applied, the selective transmission member 155 is preferably set to cut off or reflect light by lowering its transparency.

Thus, if the selective transmission member 155 provided under the light-transmitting display 151 cuts off or reflects the light having penetrated the light-transmitting display 151, readability of the light-transmitting display 151 can be enhanced.

In particular, if the light having passed through the light-transmitting display 151 is absorbed in the solar cell module 193, it is difficult to read the information to be displayed through the light-transmitting display 151. Therefore, the selective transmission member 155 preferably cuts off or reflects the light while a user controls the mobile terminal 100 via the light-transmitting display 151 or views the displayed information.

In case that a user input is generated by the user input unit or the like, the controller 180 of the mobile terminal 100 is able to activate the selective transmission member 155 if a preset setting conditions is met or a picture is displayed on the light-transmitting display.

Detailed operational status of the mobile terminal including the light-transmitting display 151 and the selective transmission member 155 are explained with reference to FIG. 7 as follows.

FIG. 7 is a diagram for explaining an operational status of the mobile terminal shown in FIG. 6.

In particular, in FIG. 7 (a), the light-transmitting display 151 is turned on [ON state] and the selective transmission member 155 is turned on as well [ON state]. In FIG. 7 (b), the light-transmitting display 151 is turned off [OFF state] and the selective transmission member 155 is turned off as well [OFF state]. In FIG. 7 (c), the light-transmitting display 151 is turned off [OFF state] and the selective transmission member 155 is turned on [ON state]. In FIG. 7 (d), the light-transmitting display 151 is turned on [ON state] and the selective transmission member 155 is turned off [OFF state].

Referring to FIG. 7 (a), when the light-transmitting display 151 is turned on [ON], if the selective transmission member 155 is controlled to enter an ON state, the light-transmitting display 151 displayed the information, as shown in FIG. 7 (a), provided by the controller 180. As mentioned in the foregoing description, while the selective transmission member 155 is in the ON state, it prevents light from being supplied to the solar cell module 193 and works as a screen on which light emitted from the light-transmitting display 151 is image-formed. Therefore, if the transmitted light is cut off by activating the selective transmission member 155, it is able to enhance readability of the light-transmitting display 151.

FIG. 7 (b) shows that the light-transmitting display 151 is in OFF state and that the selective transmission member 155 is in OFF state as well. In particular, FIG. 7 (b) shows a state that the mobile terminal 100 is ready to be charged using an externally provided light.

Of course, when the light-transmitting display 151 is in ON state, if the selective transmission member 155 maintains the OFF state, the light arrives at the solar cell module 193 to perform a charging process.

Referring to FIG. 7 (c), when the light-transmitting display 151 is in OFF state, if the selective transmission member 155 is ON state, no information is displayed on the light-transmitting display 151. And, the light supplied outside the mobile terminal 100 can be cut off or reflected by the selective transmission member 155.

Specifically, when a power is applied to the selective transmission member 155, if a selective transmission member formed of a material for cutting off and reflecting light simultaneously is selected, the selective transmission member 155 can display a shape of a reflected object like a mirror.

In the case of FIG. 7 (a) showing that the selective transmission member 151 is operative, it is able to display a shape of a reflected object. Yet, since a picture is displayed on the light-transmitting display 151, it is preferable that the light-transmitting display 151 maintains the OFF state to accurately observe the reflected object.

FIG. 7 (d) shows that the light-transmitting display 151 is in ON state and that the selective transmission member 155 is in OFF state. For instance, in a situation that the display 151 needs to be activated in order for a user to check information via the light-transmitting display 151 or to control the mobile terminal, if electric energy charged in the battery 191 of the power supply unit 190 is insufficient or two jobs of charging the mobile terminal 100 and using the mobile terminal 100 need to be performed simultaneously, the controller 180 of the mobile terminal 100 controls the light-transmitting display 151 to enter the ON state and also controls the selective transmission member 155 to enter the OFF state.

The readability of information provided by the light-transmitting display 151 in case of FIG. 7 (d) may be inferior to that in case of FIG. 7 (a). Yet, since light penetrates the light-transmitting display 151 having a picture displayed thereon and then arrives at the solar cell module 193, the charging process can be simultaneously performed.

Meanwhile, the controller 180 is able to independently control the ON-OFF of the light-transmitting display 151 and the ON-OFF of the selective transmission member 155 according to a user input.

In particular, if a user inputs ON-OFF state of the light-transmitting display 151 and the ON-OFF state of the selective transmission member 155 via the first user input unit 141 and the second used input unit 132 or the soft key 151c and the soft key 135c, respectively, the controller 180 receives the input data and then controls the light-transmitting display 151 and the selective transmission member 155.

Besides, the state shown in FIG. 7 (a) [i.e., both of the light-transmitting display 151 and the selective transmission member 155 are turned on] is set to a first mode (or a normal mode). The state shown in FIG. 7 (b) [i.e., both of the light-transmitting display 151 and the selective transmission member 155 are turned off] is set to a second mode (or a charging mode). The state shown in FIG. 7 (c) [i.e., the light-transmitting display 151 is turned off but the selective transmission member 155 is turned on] is set to a third mode (or a mirror mode). And, the state shown in FIG. 7 (d) [i.e., the light-transmitting display 151 is turned on but the selective transmission member 155 is turned off] is set to a fourth mode (or a power-saving mode). If a user selects one of the four kinds of modes, the controller 180 can control ON/OFF states of the light-transmitting display 151 and the selective transmission member 155 according to input data inputted by the user, respectively.

Thus, the user is able to individually control the ON/OFF state of each of the light-transmitting display 151 and the selective transmission member 155 or is able to simply select a specific mode. Therefore, the mobile terminal 100 according to one embodiment of the present invention is able to provide a user with freedom and convenience in manipulating the states of the light-transmitting display 151 and the selective transmission member 155 according to user's situation or user's skill in handling the mobile terminal 100.

In the following description, a process for manipulating the above-configured mobile terminal 100 is explained in detail with reference to FIG. 8.

FIG. 8 is a diagram of a mobile terminal on which icons are displayed according to manipulation performed on the mobile terminal.

Referring to FIG. 8 (a), if a power button of the mobile terminal 100 is pressed, a power of the mobile terminal 100 enters an ON state and a power option icon and icons forming an initial menu are displayed on the light-transmitting display 151 to enable a user to use mobile terminal 100.

If the user selects the power option icon, referring to FIG. 8 (b), an individual setting icon for entering a step of enabling the user to individually manipulate ON/OFF of each of the light-transmitting display 151 and the selective transmission member 155 and a mode setting icon for entering a step of selecting one of the four modes generated from combining ON/OFF states of the light-transmitting display 151 and the selective transmission member 151 are displayed on the light-transmitting display 151.

If the user selects the individual setting icon, referring to FIG. 8 (c), icons for turning on/off powers of the display 151 and the selective transmission member 155, respectively are displayed on the light-transmitting display 151. In this case, since general users are not familiar with the terminology 'selective transmission member', the corresponding terminology is preferably represented as 'light reflection function' or the like. If the user selects ON/OFF of the light-transmitting display 151 and the selective transmission member 155 individually using the displayed icons, the controller 180 controls the On/OFF states of the light-transmitting display 151 and the selective transmission member 155 according to user inputs, respectively If the user selects the mode setting icon, referring to FIG. 8 (d), mode icons for selecting the four kinds of the modes generated from combining ON/OFF states of the light-transmitting display 151 and the selective transmission member 151, respectively are displayed. As the user selects each of the mode icons, a process for controlling the light-transmitting display 151 and the selective transmission member 155 is explained in detail with reference to FIG. 19 as follows.

Figure 9:
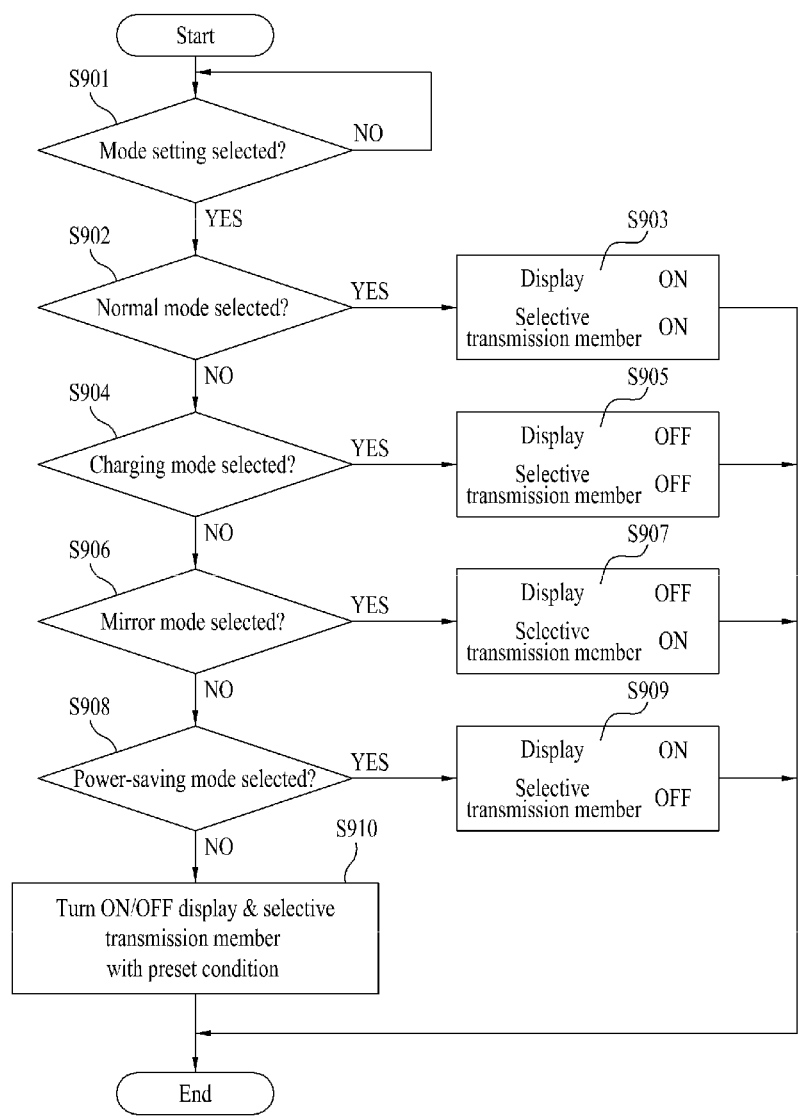
FIG. 9 is a flowchart of a process for controlling a light-transmitting display and a selective transmission member to be turned on/off according to a mode selection made by a user.

FIG. 9 is a flowchart of a process for controlling a light-transmitting display and a selective transmission member to be turned on/off according to a mode selection made by a user.

Referring to FIG. 9, the controller 180 determines whether a user selects the mode setting icon from the displayed icons shown in FIG. 8 (b) [S901].

If the user selects the mode setting, the controller 180 determines whether the normal mode icon is selected [S902]. If the controller 180 determines that the normal mode icon is selected, the controller 180 controls the light-transmitting display 151 and the selective transmission member 155 to enter the ON states [S903] and then returns.

If the user does not select the normal mode icon in the step S902, the controller 180 determines whether the user selects the charging mode icon [S904]. If the controller 180 determines that the charming mode icon is selected, the controller 180 controls the light-transmitting display 151 and the selective transmission member 155 to enter the OFF states [S905] and then returns.

If the user does not select the charging mode icon in the step S904, the controller 180 determines whether the user selects the mirror mode icon [S906]. If the controller 180 determines that the user selected the mirror mode icon, the controller 180 controls the light-transmitting display 151 and the selective transmission member 155 to enter the OFF state and the ON state, respectively [S907] and then returns.

If the user does not select the mirror mode icon in the step S906, the controller 180 determines whether the user selects the power-saving mode icon [S908]. If the controller 180 determines that the user selected the power-saving mode icon, the controller 180 controls the light-transmitting display 151 and the selective transmission member 155 to enter the ON state and the OFF state, respectively [S909] and then returns.

If the user does not select the power-saving mode in the step S908, the controller 180 controls the ON/OFF states of the light-transmitting display 151 and the selective transmission member 155 according to a preset condition (e.g., one of the four kinds of modes) [S910] and then returns.

Figure 10:
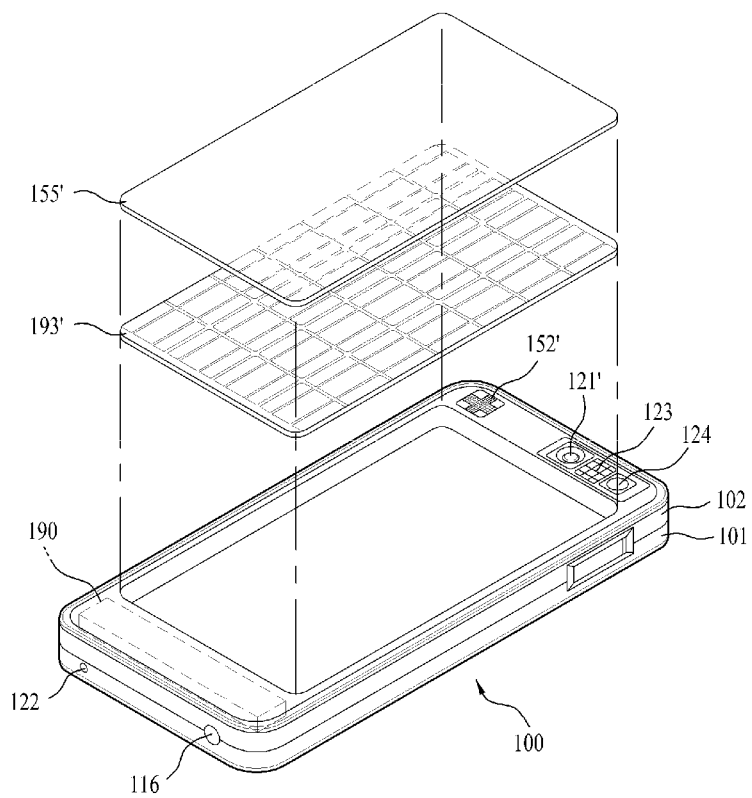
FIG. 10 is a perspective diagram of a mobile terminal according to another embodiment of the present invention.

FIG. 10 is a perspective diagram of a mobile terminal according to another embodiment of the present invention, in which the mobile terminal 100 placed upside down to have backside of the main body to face upward.

Unlike the former embodiment shown in FIG. 6 and FIG. 7, the present embodiment shown in FIG. 10 relates to a case that a solar cell module 193' configured to convert light such as sunlight to electric energy is attached not to a main body front side provided with the display of the mobile terminal 100, but to a main body backside instead of being attached under the main display of the mobile terminal 100.

In the embodiment shown in FIG. 10, the solar cell module 193' playing a role as a power supply unit is attached to the main body backside or the like and a selective transmission member 155' is provided over the solar cell module 193'.

Of course, a light-transmitting display can be provided over the selective transmission member 155' in the embodiment shown in FIG. 10. Yet, the description of providing the light-transmitting display over a selective transmission film is as good as the former description with reference to FIG. 6 and FIG. 7 and its details are omitted from the following description.

Moreover, the selective transmission member 155' performs the same function of the former selective transmission member 155 of the embodiment shown in FIG. 6 and FIG. 7 and its details are omitted from the following description.

In the former embodiment shown in FIG. 6 and FIG. 7, the selective transmission member 155 is activated to enhance the readability of the light-transmitting display 151 or bring the mirror effect. Yet, in the present embodiment shown in FIG. 10, the selective transmission member 155' is usable to generate the mirror effect selectively.

In case that the solar cell module 193' is provided to the main body backside, a user has to turn the backside of the main body upside down to be exposed toward a light source for a charging and the like.

If the mobile terminal 100 is turned upside down, the user is unable to control the mobile terminal 100 or check the information provided through the display. Therefore, if the charging is completed, the user is facilitated to recognize the charging complete status through the mirror effect.

In particular, while the mobile terminal 100 is turned upside down, the controller controls the selective transmission member 155' to enter the OFF state so that the solar cell module 193' can charge the battery 191. If a charged level of the battery 191 becomes equal to or higher than a predetermined level or the charging is completed, the controller 180 controls the selective transmission member 155' to enter the ON state.

Once the controller 180 controls the selective transmission member 155' to enter the ON state, the main body backside of the mobile terminal 100 reflects a shape of an object like a mirror so that a user can recognize the completion of the charging.

Moreover, the controller 180 is able to control the selective transmission member 155' so that the mirror effect can be generated repeatedly and periodically. If so, since the selective transmission member 155' reflects the light provided by the light source periodically, a user is facilitated to recognize the completion of the full charging.

Thus, in addition to the advantage that the user is informed of the completion of the full charging by selectively reflecting the light using the selective transmission member 155', if a text message or an incoming call is received, the selective transmission member 155' is usable to indicate the reception.

In particular, when a user turns the mobile terminal 100 in manner mode upside down in the course of performing a charging of the mobile terminal 100, if a text message or an incoming call is received, the controller 180 controls the selective transmission member 155' to perform the light reflection repeatedly. Therefore, the user can recognize the reception of the text message or incoming call. And, a method of controlling the selective transmission member 155' can be set different for a case that a charged level of the battery becomes equal to or higher than a predetermined level (or a charging is completed), a case that a text message is received, or a case that an incoming call is received.

In particular, if a battery is charged over a predetermined level or is fully charged, the selective transmission member 155' is controlled to keep staying in the ON state. If a text message is received, the selective transmission member 155' is controlled to periodically enter an ON state with a prescribed interval. If an incoming call is received, the selective transmission member 155' is controlled to periodically enter an ON state with an interval different from that for the incoming call. Therefore, a user is facilitated to recognize each of the above-mentioned cases.

Besides, the selective transmission member 155' is controlled to prevent an overcharging of the battery 191 by the light reflecting method as well as to inform a user of the full charging status of the mobile terminal 100.

In particular, in order to prevent the battery 191 from being overcharged, the selective transmission member 155' can be controlled in a manner of being turned on to reflect or cut off light.

According to the embodiment shown in FIG. 10, when the selective transmission member 155' is controlled to reflect or cut off light by being controlled to enter the ON state, a backside of the mobile terminal 100 is usable as a mirror. A female user generally carries a mirror or the like. In this case, the mobile terminal is usable as a mirror.

In order to selectively generate the mirror effect to meet user's necessity, the user needs to make a user input to generate the mirror effect using the user input unit 130 or the like.

In particular, if a user input for controlling the selective transmission member 155' to enter an ON state is generated from pressurizing the user input unit 130 of a button type or such a setting condition as a full charging of a battery, a reception of a text message, a reception of a call signal and the like is met, the controller 180 is able to control the selective transmission member 155' to enter the ON state.

In case that the selective transmission member 155' is provided for the mirror function, a user input unit of a button type or the like can be provided to the main body of the mobile terminal 100.

Figure 11:
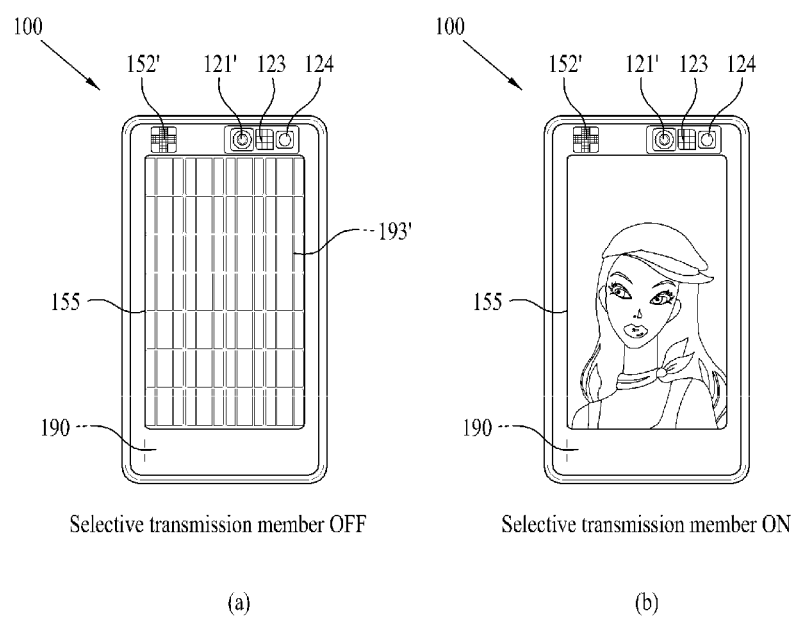
FIG. 11 is a diagram for explaining an operational status of the mobile terminal shown in FIG. 10.

FIG. 11 is a diagram for explaining an operational status of the mobile terminal shown in FIG. 10. FIG. 11 (a) shows that the selective transmission member 155' is turned off [OFF state]. And, FIG. 11 (b) shows that the selective transmission member 155' is turned on [ON state].

Referring to FIG. 11 (a), when the selective transmission member 155' is controlled to stay in OFF state, a solar cell module 193' provided to the mobile terminal 100 converts such a light source as sunlight to electric energy to use for a charging.

When a charging is completed or the selective transmission member 155' is controlled to enter the ON state, the selective transmission member 155' is able to cut off or reflect the light. Referring to FIG. 11 (b), if the selective transmission member 155' having such a light reflective property of a mirror is controlled to enter the ON state, it is ale to reflect a user's shape like a mirror. Therefore, the user is able to use the mobile terminal 100 as a mirror.

Meanwhile, if a charged level of the battery 191 is lowered below a predetermined level, the controller 180 is able to control to automatically execute a charging process of the solar cell module 193/193'. In particular, if a charged level of the battery 191 is lowered below a predetermined level, the controller controls the selective transmission member 155/155' to enter the OFF state. Once the selective transmission member 155/155' enters the OFF state, the light incident on the mobile terminal 100 penetrates the selective transmission member 155/155' and then enters the solar cell module 193/193' to enable the charging process to proceed. Therefore, even if a user forgets to charge the battery 191, it is advantageous in that the battery 191 can be automatically charged.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a light-transmitting display configured to visually display information;
a solar cell module having the light-transmitting display loaded therein;
a selective transmission member provided between the light-transmitting display and the solar cell module, wherein the selective transmission member is configured to selectively transmit or cut off light according to a presence or non-presence of an application of power to the selective transmission member; and
a controller configured to control the light-transmitting display and the selective transmission member.

2. The mobile terminal of claim 1, wherein the controller controls ON/OFF states of the light-transmitting display and the selective transmission member according to a user input or a setting condition.

3. The mobile terminal of claim 2, wherein the controller independently controls the respective ON/OFF state of the light-transmitting display and the selective transmission member according to the user input.

4. The mobile terminal of claim 2, wherein the controller is further configured to control the light-transmitting display and the selective transmission member to enter one mode selected from a plurality of modes consisting of: a first mode when both the light-transmitting display and the selective transmission member are respectively in the ON state, a second mode when both the light-transmitting display and the selective transmission member are respectively in the OFF state, a third mode when the light-transmitting display and the selective transmission member are in the OFF state and the ON state, respectively, and a fourth mode when the light-transmitting display and the selective transmission member are in the ON state and the OFF state, respectively.

5. The mobile terminal of claim 2, wherein the ON/OFF state of the selective transmission member is controlled to be repeated with a predetermined time interval.

6. The mobile terminal of claim 5, further comprising a battery charged with electric energy converted in the solar cell module, wherein the controller controls the ON/OFF state of the selective transmission member to be repeated with the predetermined time interval when a charged level of the battery becomes equal to or higher than a predetermined level, a text message is received or a call signal is received.

7. The mobile terminal of claim 6, wherein the predetermined time interval for controlling the ON/OFF state of the selective transmission member repeatedly varies differently when the charged level of the battery becomes equal to or higher than the predetermined level, the text message is received or the call signal is received.

8. The mobile terminal of claim 1, further comprising a battery charged with electric energy converted in the solar cell module, wherein the controller controls the selective transmission member to automatically enter an OFF state when a charged level of the battery becomes equal to or lower than a predetermined level.

9. The mobile terminal of claim 1, wherein when the selective transmission member is controlled to enter an ON state by the application of power thereto, the selective transmission member reflects the light.

10. The mobile terminal of claim 1, further comprising a light-transmitting housing configured to transmit the light.

11. A method of controlling a mobile terminal having a housing, a light-transmitting display loaded in the housing for visually displaying information, a solar cell module, and a selective transmission member provided between the light-transmitting display and the solar cell module for selectively transmitting light according to a presence or non-presence of an application of power, the method comprising:
controlling an ON/OFF state of each of the light-transmitting display and the selective transmission member according to a user input or a setting condition.

12. The method of claim 11, wherein the respective ON/OFF state of the light-transmitting display and the selective transmission member is independently controlled according to the user input.

13. The method of claim 11, wherein the light-transmitting display and the selective transmission member are controlled to enter one mode selected from a plurality of modes consisting of: a first mode when both the light-transmitting display and the selective transmission member are respectively in the ON state, a second mode when both the light-transmitting display and the selective transmission member are respectively in the OFF state, a third mode when the light-transmitting display and the selective transmission member are in the OFF state and the ON state, respectively, and a fourth mode when the light-transmitting display and the selective transmission member are in the ON state and the OFF state, respectively.

14. The method of claim 11, wherein the mobile terminal further comprises a battery charged with electric energy converted in the solar cell module, and wherein the selective transmission member is controlled to automatically enter the OFF state when a charged level of the battery becomes equal to or lower than a predetermined level.

* * * * *